US005487370A

United States Patent [19]

Miyazaki

[11] Patent Number: 5,487,370

[45] Date of Patent: Jan. 30, 1996

[54] FUEL OIL IMPROVEMENT APPARATUS

[75] Inventor: Minoru Miyazaki, Tosu, Japan

[73] Assignee: Atsushi Maki, Tokyo, Japan

[21] Appl. No.: 377,956

[22] Filed: Jan. 25, 1995

[30] Foreign Application Priority Data

Feb. 2, 1994 [JP] Japan .................................. 6-030916

[51] Int. Cl.[6] .................................................. B01D 35/06

[52] U.S. Cl. ............................................................ 123/538

[58] Field of Search ............................ 123/538; 210/222

[56] References Cited

U.S. PATENT DOCUMENTS

| | | | |
|---|---|---|---|
| 4,357,237 | 11/1982 | Sanderson | 123/538 |
| 4,469,076 | 9/1984 | Wolff | 123/538 |
| 4,611,615 | 9/1986 | Petrovic | 123/538 |
| 4,865,730 | 9/1989 | Lam et al. | 123/538 |
| 4,933,151 | 6/1990 | Song | 210/222 |
| 5,076,246 | 12/1991 | Onyszczuk | 123/538 |
| 5,127,385 | 7/1992 | Dalupin | 123/538 |
| 5,243,946 | 9/1993 | Dalupan | 123/538 |
| 5,364,536 | 11/1994 | Mercier | 210/222 |

*Primary Examiner*—David A. Okonsky
*Attorney, Agent, or Firm*—Koda and Androlia

[57] ABSTRACT

To save energy and reduce pollution by exerting magnetic fields on fuel oil to facilitate to convert oil particles into minute particles. The apparatus includes a multiplicity of annular or disk-like permanent magnets 26 having one surface of N pole and the other surface of S pole and arranged in close contact with each other in mutually repulsive relation to be enclosed into a closed case 25 to form a repulsive magnetic field producing body 20 adapted to produce repulsive magnetic fields produced by the permanent magnets disposed in the mutually repulsive relation in outer peripheral portions of the case, a cylindrical casing 11 in which the repulsive magnetic field producing body is held loosely and having an inlet of fuel oil 13 formed in one end and an outlet 13 of fuel oil formed in the other end and an annular loose space formed between the producing body and the cylindrical casing to constitute an outer peripheral oil passage 24 of fuel oil which communicates with an inlet and an outlet of fuel oil, whereby the repulsive magnetic fields produced by the repulsive magnetic field producing body 20 are exerted on fuel oil passing through the outer peripheral oil passage to convert oil particles of fuel oil into minute particles.

3 Claims, 3 Drawing Sheets

FUEL OIL IMPROVEMENT APPARATUS

BACKGROUND OF THE INVENTION

The present invention relates to an improvement apparatus of fuel oil to be fed disposed between a supply system such as an oil tank and a combustion system such as an engine in, for example, an automobile to magnetically process fuel oil from the supply system and feed it to the combustion system.

Generally, fuel oil fed from the supply system such as the oil tank to the combustion system such as the engine uses a so-called unprocessed fuel oil with particles having a diameter of 0.45 to 0.6 μm and oil molecules combined with each other. The unprocessed fuel oil is composed of particles having a large diameter and a small contact area with air. Accordingly, when-the fuel oil is used in the combustion system as it is, incomplete combustion occurs and the combustion efficiency is reduced to thereby increase the fuel consumption amount. Further, reduction of the combustion efficiency increases the concentration of exhaust smoke and adverse influence to the human being due to substance of minute particles in the exhaust smoke is pointed out. Further, harmful substance such as carbohydrate (HC) and nitrogen oxide (NOx) is produced much.

In order to solve the above-problems, an trial of obtaining an apparatus in which fuel oil is magnetically processed to separate mutually combined oil molecules constituting fuel oil so that particles is made small and fuel oil having good combustion efficiency is fed to the combustion system has been widely made. As one of such trials, the present invention has proposed a fuel oil improvement apparatus (prior art apparatus) in Japanese Patent Application No. Sho-60-262022.

The fuel oil improvement apparatus includes a plurality of annular permanent magnets fixedly disposed in a cylindrical casing having one end in which an oil inlet is formed and the other end in which an oil outlet is formed so that the magnets are arranged in close contact with each other in series in repulsive relationship to each other. The repulsive magnetic field produced by the annular permanent magnets is exerted in an inner peripheral portion of the annular permanent magnets corresponding to a passage of fuel oil and particles of fuel oil passing therethrough are made small to feed the improved fuel oil to the combustion system.

The repulsive magnetic field produced by the annular permanent magnets arranged into the repulsive relation occurs in both of an outer peripheral side and an inner peripheral side of the permanent magnets, while the strength of the magnetic field in the outer peripheral side is stronger than that in the inner peripheral side.

However, the prior art apparatus does not utilize the stronger repulsive magnetic field in the outer peripheral side but utilizes only the repulsive magnetic field in the inner peripheral side. Accordingly, the sufficient repulsive magnetic field in accordance with the magnetic flux density cannot be exerted in the inner peripheral portion. Consequently, improvement of the combustion efficiency and reduction of the concentration of exhaust smoke are attained as compared with the case where unprocessed fuel oil is fed to the combustion system, while satisfactory effects cannot be obtained.

Furthermore, in the prior art apparatus, since the permanent magnets directly come into contact with fuel oil, the permanent magnets absorb impurities contained in the fuel oil and the original performance of the permanent magnets cannot be maintained for a long time.

SUMMARY OF THE INVENTION

It is an object of the present invention to provide a fuel-oil-to-be-fed improvement apparatus in which effective repulsive magnetic fields are always produced stably in accordance with the magnetic field density without impeding the original characteristics of permanent magnets and act on fuel oil to facilitate to convert oil particles into minute particles to thereby solve antipodal demands of saving energy and prevention of pollution such as improvement of the combustion efficiency, power up of the combustion system, reduction of the fuel consumption quantity and reduction of the exhaust smoke concentration, carbon monoxide or hydrocarbon at one effort.

In order to solve the above problems, the fuel oil-to-be-fed improvement apparatus according to the present invention comprises a multiplicity of annular or disk-like permanent magnets having one surface of N pole and the other surface of S pole and arranged in close contact with each other in mutually repulsive relation to be enclosed into a closed case to form a repulsive magnetic field producing body adapted to produce repulsive magnetic fields produced by the permanent magnets disposed in the mutually repulsive relation in outer peripheral portions of the case, a cylindrical casing in which the repulsive magnetic field producing body is held loosely and having an inlet of fuel oil formed in one end and an outlet of fuel oil formed in the other end, and annular loose space formed between the repulsive magnetic field producing body and the cylindrical casing to constitute an outer peripheral oil passage of fuel oil which communicates with an inlet and an outlet of fuel oil, whereby the repulsive magnetic fields produced by the repulsive magnetic field producing body are exerted on fuel oil passing through the outer peripheral oil passage to convert oil particles of fuel oil into minute particles.

The repulsive magnetic field producing body having the multiplicity of annular or disk-like permanent magnets in the mutually repulsive structure enclosed in the closed case produces repulsive magnetic fields of S and N poles in the whole outer peripheral portion much. When fuel oil passes from the oil inlet through the outer peripheral oil passage formed in the annular space between the cylindrical casing and the repulsive field producing body, the fuel oil brings into contact with the strong and stable repulsive magnetic fields corresponding to the magnetic flux density produced by the repulsive magnetic field producing body and receives the sufficient magnetization operation effectively to convert oil particles thereof into minute particles, which is fed to the combustion system. Accordingly, in the combustion system, the combustion efficiency is increased and the fuel consumption quantity is reduced. Further, since occurrence of exhaust gas is also suppressed, harmful minute particle substance in exhaust smoke is reduced and carbon monoxide and hydrocarbon in the exhaust gas are also reduced.

DESCRIPTION OF THE PREFERRED EMBODIMENT

Figure 1:
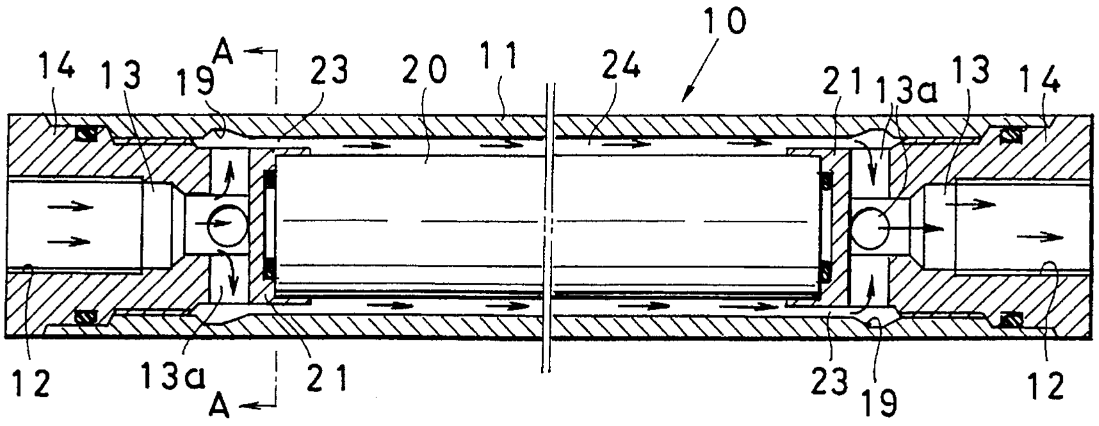
FIG. 1 is a sectional view illustrating an embodiment of the fuel oil improvement apparatus according to the present invention.
Figure 2:
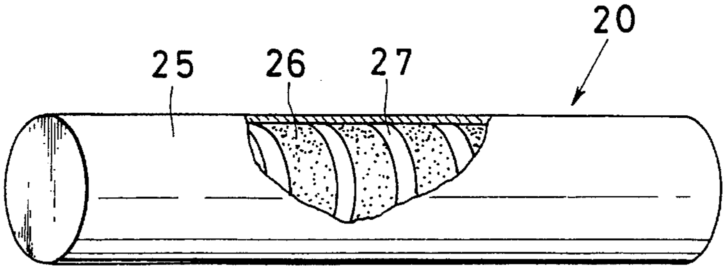
FIG. 2 is a partially broken perspective view of a repulsive magnetic field producing body constituting the apparatus of the present invention.

The present invention is now described with reference to an embodiment shown in the accompanying drawings.

In the drawings, numeral 11 denotes a casing constituting an outer shell of the fuel oil improvement apparatus 10 of the present invention and formed into a cylindrical shape. The casing 11 may be made of iron or stainless steel, while the casing is preferably made of non-magnetic material, for example, aluminum so as to prevent the magnetic field of a repulsive magnetic field producing body 20 disposed in the casing from being leaked to the outside of the casing and prevent adverse influence to electronic devices mounted in a vehicle. Fitted airtightly into openings formed in both ends of the casing 11 are peg members 14 having a mounting hole 12 and an inlet/outlet 13 for fuel oil formed in the center thereof. A connection member (not shown) can be engaged in the mounting hole 12 and one of the inlet/outlets 13 can be connected through the connection member to a fuel hose 16 on the side of a combustion system 15 and the other of the inlet/outlets 13 can be connected through the connection member to a fuel hose 18 on the side of an oil tank 17. The combustion system 16 is, for example, a diesel engine or gasoline engine of an automobile, a boiler, a diesel engine of a ship, a combustion portion of an air conditioner or the like.

The inlet/outlet 13 for fuel oil is diverged into four radial portions at an inner end of the peg member 14 to form radial inlet/outlets **13*a* having openings facing to an inner surface of the casing 11. Annular oil guide grooves 19 are formed in an inner peripheral surface of the casing 11 opposite to the openings of the radial inlet/outlets 13*a*. A bracket 21 for fixedly holding the repulsive magnetic field producing body 20 from both sides is integrally formed in the inner end of the peg member 14. Four surface portions on the outer peripheral surface of the bracket 21 are planed off into flat surfaces 22 and oil passages 23 are formed between the flat surfaces 22 and the casing 11. The oil passage 23 communicates with the oil guide groove 19**.

Figure 3:
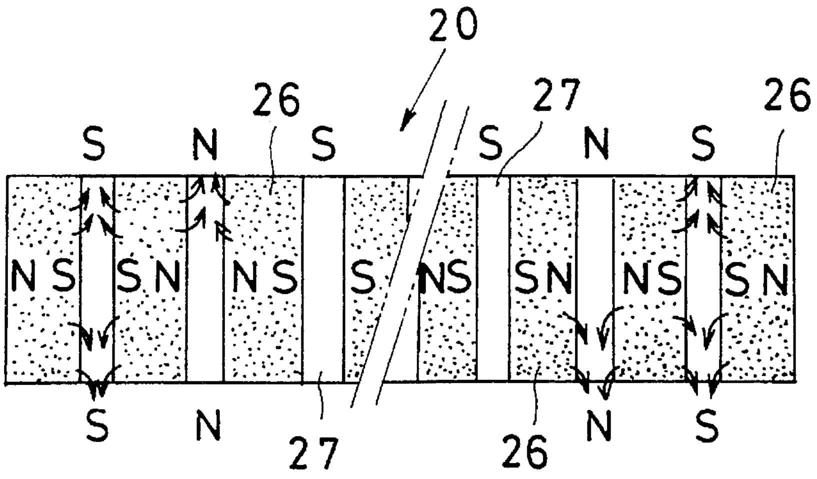
FIG. 3 is a schematic diagram illustrating an inner structure of the repulsive magnetic field producing body.
Figure 4:
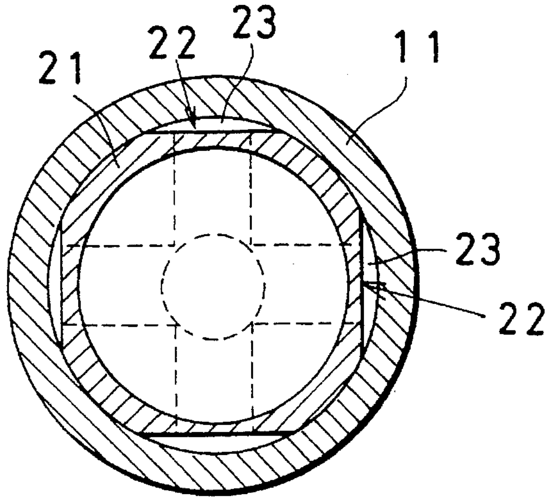
FIG. 4 is an enlarged sectional view taken along line A—A of FIG. 1.
Figure 5:
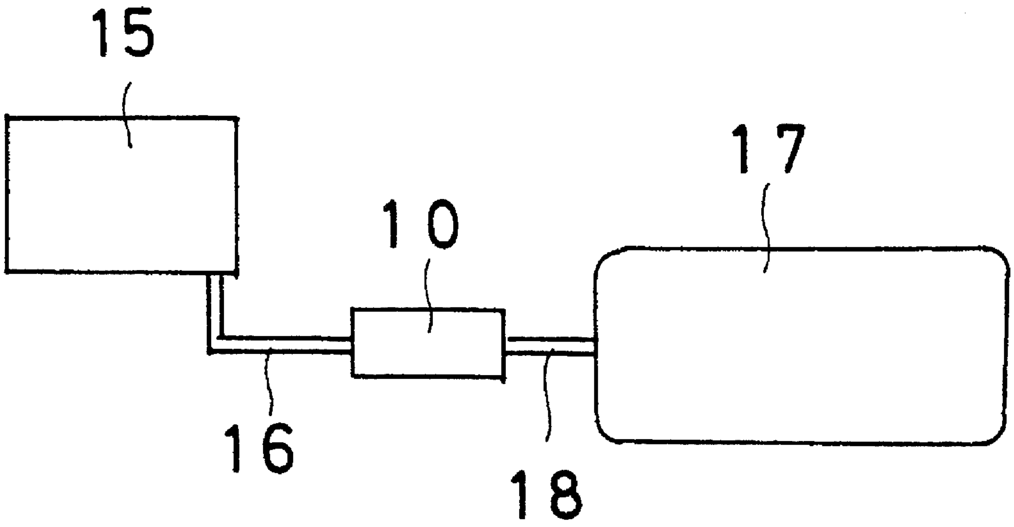
FIG. 5 is a schematic diagram illustrating a disposition of the apparatus of the present invention.

The repulsive magnetic field producing body 20 is held loosely within the casing 11 through an O-ring by the brackets 21 when the peg member 14 is fitted completely. The annular loose space between the repulsive magnetic field producing body 20 and the casing 11 forms an outer peripheral oil passage 24 for fuel oil. The repulsive magnetic field producing body 20 includes a plurality of annular or discoidal permanent magnets 26 having one surface of N pole and the other surface of S pole and which are arranged in a closed case 25 in the following relation. More particularly, as shown in FIG. 3, the permanent magnets 26 are enclosed in the closed case 25 and are arranged in series in close contact with each other so that adjacent polar surfaces of the permanent magnets are repulsive to each other, that is, (N, S), (S, N), (N, S). Accordingly, fuel oil does not directly come into contact with the permanent magnets 26 disposed in the closed case. The permanent magnets 26 are magnetized so that the repulsive magnetic fields of the S pole or N pole are produced in the outer peripheral portions between the adjacent permanent magnets. Yokes 27 for collecting magnetic lines of force are interposed between the adjacent permanent magnets 26. The yokes 27 act to effectively collect the magnetic lines of force of the permanent magnets 26 and increase the repulsive magnetic field produced in the outer peripheral portion.

The closed case 25 is preferably made of magnetic substance such as stainless steel or iron in order to effectively produce the repulsive magnetic field externally. Further, in order to effectively realize the magnetic fields by the adjacent permanent magnets, the permanent magnets 26 is made of magnetic material having the magnetic flux density of 1000 G or more, preferably 4000 to 12000 G and the magnetic flux density is preferably uniform. For example, the permanent magnets are made of known material such as ferrite or neodymium. In addition, in order to effectively collect the magnetic lines of force of the permanent magnets 26, the yoke 27 is preferably made of iron, aluminum or brass and formed into a ring having a thickness of about 1.2 to 3 mm and an outer diameter equal to that of the permanent magnet 26.

Operation of the apparatus of the present invention structured above is now described. The apparatus is provided between the combustion system 15 and the oil tank 16. One side of the apparatus is connected through the connection member mounted in the hole 12 to the fuel hose 16 on the side of the combustion system 15 and the other side of the apparatus is connected through the connection member to the fuel hose 18 on the side of the oil tank 17. Unprocessed fuel oil fed from the oil tank 17 to the inlet/outlet 13 of the casing 11 flows from the radial inlet/outlets **13*a* through the oil guide groove 19 and the oil passage 23 to the outer peripheral oil passage 24. The outer peripheral oil passage 24 is filled with the repulsive magnetic fields of the S and N poles produced from the outer peripheral portion of the repulsive magnetic field producing body 20. When the repulsive magnetic fields are produced, the magnetic lines of force of the permanent magnets 26 are collected effectively by the yokes 27 and accordingly the repulsive magnetic fields are produced in accordance with the magnetic flux density without attenuation of the magnetic force. Accordingly, the strong and stable repulsive magnetic fields always act on fuel oil flowing through the outer peripheral oil passage 24**.

The repulsive magnetic fields are much produced in the outer peripheral oil passage 24 complicatedly and uniformly. Coupling force of oil molecules constituting particles of fuel oil is weakened by the repulsive force of the repulsive magnetic fields to have a tendency to separate each of them into small particles. The small particles are confused due to arrangement in the direction corresponding to the respective magnetism in the promiscuous state and are subjected to the magnetic agitation, so that the particles are divided by the mutual friction between molecules to be formed into minute particles. By repeating the above operation, the diameter of the oil particles is changed from 0.45 to 0.6 μm for unprocessed particles to about 0.25 to 0.3 μm. The fuel oil thus improved is collected in the other inlet/outlet 13 and fed to the combustion system 15. In the combustion system 15, since spraying and scattering of the improved fuel oil are made easily, the fuel oil is diffused and combusted at high temperature to obtain combustion near to the complete combustion. Accordingly, the combustion efficiency is improved and the fuel consumption quantity is reduced. Further, combustion with low oxygen can be attained and accordingly the exhaust smoke concentration and hydrocarbon are also reduced at the same time.

[Embodiment 1]

The fuel consumption efficiency and the exhaust gas quantity were measured for the case where the apparatus 10 of the present invention having the following factors was mounted in a gasoline engine car (the name of the car is the Volkswagen having the displacement of 1800 cc) and for the case where the apparatus was not mounted.

(Factors)

Casing: full length 275 mm, outer diameter 32 mm, inner diameter 26 mm, made of aluminum Closed case: full length 200 mm, outer diameter 20 mm, inner diameter 18.4 mm, made of stainless steel Annular permanent magnet: outer diameter 18 mm, inner diameter 12 mm, thickness 7 mm, number of magnets 20, made of neodymium, magnetic flux density per magnet 9000 G Yoke: outer diameter 18 mm, inner diameter 12 mm, thickness 3 mm, number of yokes 19, made of stainless steel (Measurement Conditions)

For the fuel consumption efficiency, great importance is attached to traveling in a city and a traveling distance of one time is about 110 km. The quantity of used gasoline for each traveling was measured three times and an average value of a traveling distance per litter was calculated.

For the exhaust gas quantity, after travelling in a city, exhaust smoke under no load was collected from a muffler and the quantity of HC (hydrocarbon) in the exhaust smoke was measured by an exhaust gas measurement apparatus three times.

(Measurement Result)

For the fuel consumption efficiency, the average traveling distance per litter was 10.2 km when the apparatus of the present invention was not mounted, while it was 11.7 km when the apparatus was mounted. The fuel consumption efficiency upon mounting of the apparatus was increased about 15% as compared with the case where the apparatus was not mounted. The HC exhaust quantity was 22 ppm on average when not mounted, while the HC exhaust quantity was 16 ppm when mounted and was reduced about 32% as compared with the case where the apparatus was not mounted.

In the embodiment, the annular permanent magnets are used by way of example, while a disk-like permanent magnets may be used. Further, the apparatus 10 of the present invention can be applied to, for example, a boiler, a diesel engine of a ship, a combustion system and supply system of an air conditioning system and the like.

I claim:

1. An improvement apparatus of fuel oil to be fed, comprising a multiplicity of annular or disk-like permanent magnets having one surface of N pole and the other surface of S pole and arranged in close contact with each other in mutually repulsive relation to be enclosed into a sealed case to form a repulsive magnetic field producing body adapted to produce repulsive magnetic fields produced by said permanent magnets disposed in the mutually repulsive relation in outer peripheral portions of said case, a cylindrical casing in which said repulsive magnetic field producing body is held loosely and having an inlet of fuel oil formed in one end and an outlet of fuel oil formed in the other end, and annular loose space formed between said repulsive magnetic field producing body and said cylindrical casing to constitute an outer peripheral oil passage of fuel oil which communicates with an inlet and an outlet of fuel oil, whereby the repulsive magnetic fields produced by said repulsive magnetic field producing body are exerted on fuel oil passing through said outer peripheral oil passage to convert oil particles of fuel oil into minute particles.

2. An improvement apparatus of fuel oil to be fed according to claim 1, comprising magnetic-lines-of-force collecting yokes disposed between adjacent permanent magnets to effectively collect magnetic lines of force of said permanent magnets to increase the repulsive magnetic fields.

3. An improved apparatus of fuel oil according to claim 2, wherein said inlet of fuel oil comprises a peg member inserted into and closing one end of said cylindrical casing, an axially extending inlet passage provided in said peg member and a plurality of passages extending radially from said inlet passage to said annular loose space.

* * * * *